United States Patent Office 3,119,823
Patented Jan. 28, 1964

3,119,823
PROCESS FOR PREPARATION OF o-HYDROXY-PHENYL-TRIAZINES
Seymour L. Shapiro, deceased, late of Hastings on Hudson, N.Y., by Florence M. Shapiro, executrix, Hastings on Hudson, and Louis Freedman, Bronxville, N.Y., assignors to U.S. Vitamin & Pharmaceutical Corporation, New York, N.Y., a corporation of Delaware
No Drawing. Filed Sept. 10, 1962, Ser. No. 222,715
3 Claims. (Cl. 260—249.9)

This application is concerned with a novel process for the preparation of o-hydroxyphenyl-triazine derivatives which by virtue of their structural characteristics are particularly useful as the active ingredient in sun-screening agents. In particular, the triazines of this application are compounds of the type 2-amino-4-substituted amino-6-o-hydroxy-phenyl-s-triazines of the formula shown (I)

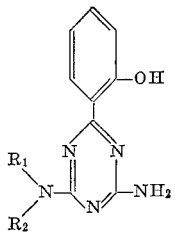

I wherein $R_1$ is phenyl, chlorophenyl, allyl, benzyl or lower alkyl, and $R_2$ is methyl or hydrogen.

For processing the compounds of this invention, the customary procedure [see Shapiro et al., J. Am. Chem. Soc., 81, 1994 (1960)] of reaction of an ester with the appropriately substituted biguanide in methanol proved unsuccessful, and the novel procedure of this invention which proved to be practicable was the reaction of the biguanide base with an excess of a lower alkyl salicylate at an elevated temperature.

The process for the compounds of this invention will be more clearly understood after consideration of the following specific example which is given for the purpose of illustration only and is not to be construed as limiting the scope of the invention in any way.

EXAMPLE 2-amino-6-o-hydroxy-phenyl - 4 - β-phenethylamino-s-triazine. A mixture of 4.8 g. (0.02 mole) of β-phenethylbiguanide hydrochloride in 15 ml. of methanol and 5 ml. (0.02 mole) of 23% sodium methoxide in methanol, after filtration of formed sodium chloride was evaporated to give the biguanide free base which was granulated under pentane and dried. The biguanide was suspended in 5 ml. (excess) of methyl salicylate and heated in an oil bath maintained at 115° for 20 minutes with noted evolution of basic fumes. When cool, the formed syrup was granulated under pentane to give 5.49 g. (81%) of product.

Instead of the methyl salicylate a lower alkyl ester of salicyclic acid such as ethyl salicylate or propyl salicylate would also be used.

The compounds prepared in this manner are listed and characterized in the table.

Table
6-o-HYDROXY-PHENYL TRIAZINES (I)

| $R_1$ | $R_2$ | M.P.,[a] °C. | U.V. Spectra in Methanol [b] λ max, mμ (eX10⁻³) |
|---|---|---|---|
| $CH_3$— | $CH_3$— | 187–188 | 248 (19.9); 313 (7.7) |
| $CH_2$=$CHCH_2$— | H | 164–165 | 251 (15.5); 315 (7.2) |
| n-$C_4H_9$— | H | 176–177 | 251 (17.6); 314 (6.9) |
| n-$C_5H_{11}$— | H | 148–150 | 250 (18.0); 314 (7.1) |
| $C_6H_5CH_2CH_2$— | H | 164–166 | 250 (18.4); 315 (7.1) |
| $C_6H_5CH_2$— | $CH_3$— | 154–155 | 248 (21.6); 313 (7.8) |
| $C_6H_5$— | H | 221–223 | 257 (33.3); 314 (11.6) |
| p-$ClC_6H_5$— | H | 249–251 | 262 (35.4); 292–315 (13.9) |

[a] Compounds were recrystallized from ethanol-water mixtures.
[b] The spectra were unchanged when run in 0.1 molar sodium methoxide in methanol.

As is noted from the ultraviolet absorption spectra, the compounds of this application show significant absorption with a maximum in the region of 313–315 mμ which permits screening out of the wave lengths causing the most serious sunburn. The ultraviolet spectra also indicate hydrogen bonding between the CH hydrogen and the 1-nitrogen of the triazine ring.

The compounds prepared by the process of this invention can be formulated as water-miscible lotions, or as sun-tan oils which contain 0.5 to 5.0% of active ingredient of this application, following procedures well established in the art.

The compounds prepared by the process of this invention by virtue of their functional hydroxyl and amino groups are also useful in the preparation of important derivatives of these groups such as acetates, carbamates and the like.

It is to be understood that it is intended to cover all changes and modifications of the example herein chosen for the purpose of illustration which do not constitute departure from the spirit and scope of the invention.

This application is a continuation-in-part of our application Serial Number 40,541, filed July 5, 1960, and now abandoned.

We claim:
1. The process of preparing o-hydroxyphenyl-triazines of the formula

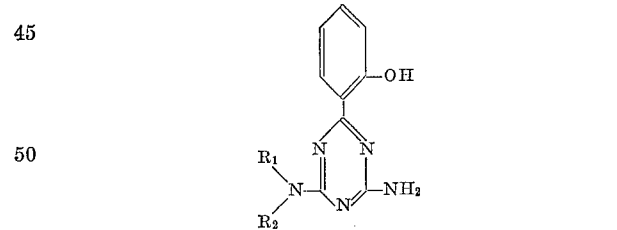

wherein $R_1$ is selected from the group consisting of phenyl, chlorophenyl, allyl, benzyl, phenethyl and lower alkyl and $R_2$ is selected from the group consisting of hydrogen and methyl, which consists in reacting a biguanide free base of the formula $$R_1 \diagdown N-C \diagdown C-NH_2 \atop R_2 \diagup \| \atop NH \quad \| \atop NH$$

wherein $R_1$ and $R_2$ are the same as above, with an excess of a lower alkyl ester of salicyclic acid at a temperature of at least about 115° C., cooling the mixture, and recovering the o-hydroxyphenyl-triazine from the cooled mixture.

2. The process of preparing o-hydroxyphenyl-triazines of the formula

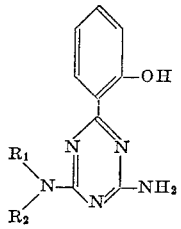

wherein $R_1$ is selected from the group consisting of phenyl, chlorophenyl, allyl, benzyl, phenethyl and lower alkyl and $R_2$ is selected from the group consisting of hydrogen and methyl, which consists in reacting a biguanide free base of the formula

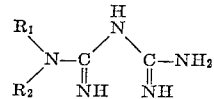

wherein $R_1$ and $R_2$ are the same as above, with an excess of methyl salicylate at a temperature of at least about 115° C., cooling the reaction mixture, and recovering the o-hydroxyphenyl-triazine from the cooled mixture.

3. The process according to claim 2, wherein the reaction mixture is maintained at a temperature of about 115° C. for a period of about 20 minutes.

References Cited in the file of this patent

UNITED STATES PATENTS 2,386,517    Thurston _____ Oct. 9, 1945